United States Patent
Biederman et al.

(10) Patent No.: US 9,547,588 B1
(45) Date of Patent: Jan. 17, 2017

(54) SYSTEM AND METHOD OF DATA STORAGE IN FLASH MEMORY

(71) Applicant: VIOLIN MEMORY INC., Santa Clara, CA (US)

(72) Inventors: Daniel C. Biederman, San Jose, CA (US); Jon C. R. Bennett, Sudbury, MA (US)

(73) Assignee: VIOLIN MEMORY INC., Santa Clara, CA (US)

( * ) Notice: Subject to any disclaimer, the term of this patent is extended or adjusted under 35 U.S.C. 154(b) by 32 days.

(21) Appl. No.: 14/481,102

(22) Filed: Sep. 9, 2014

Related U.S. Application Data

(60) Provisional application No. 61/857,871, filed on Jul. 24, 2013.

(51) Int. Cl.
*G06F 12/00* (2006.01)
*G06F 12/02* (2006.01)

(52) U.S. Cl.
CPC ... *G06F 12/0246* (2013.01); *G06F 2212/7211* (2013.01)

(58) Field of Classification Search
CPC .................. G06F 12/0246; G06F 2212/7211
USPC ........................................... 711/103
See application file for complete search history.

(56) References Cited

U.S. PATENT DOCUMENTS 8,411,510 B2 * 4/2013 Son .................. G11C 16/04
365/185.02

* cited by examiner

*Primary Examiner* — Jasmine Song
(74) *Attorney, Agent, or Firm* — Brinks Gilson & Lione

(57) ABSTRACT

Flash memory is subject to a wear out failure mechanism which may depend on the number of times each cell of the memory is programmed and erased. The higher the programming voltage used, the more rapidly the cell degrades. A system and method for reducing the average programming voltage for data sets is disclosed.

17 Claims, 6 Drawing Sheets

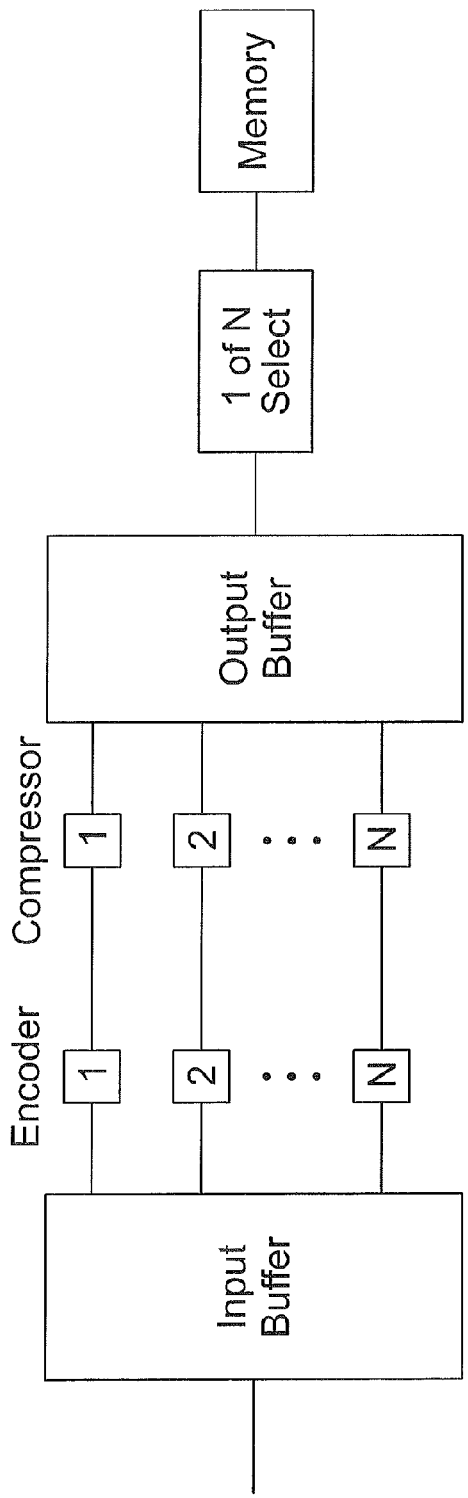
FIG. 8A
FIG. 8B

SYSTEM AND METHOD OF DATA STORAGE IN FLASH MEMORY

This application claims the benefit of U.S. provisional application Ser. No. 61/857,871, filed Sep. 10, 2013, which is incorporated herein by reference.

TECHNICAL FIELD

The present application relates to computer memory systems, and a method of using the same.

BACKGROUND

Computer memory systems may be either of the persistent or non-persistent type. Examples of persistent memory types are magnetic cores, disk drives, tape drives and semiconductor Flash memories. Non-persistent memory types may be semiconductor memories such as DRAM or the like. Non-persistent memory types typically have rapid access times for both reading and writing of data and are used as computer main memory or cache memory. The data is retained in such memories by means which require a supply of power, and the information stored therein may be lost if the power is interrupted. Systems of non-persistent memory usually have a back-up power supply, which may be a capacitive storage device for short duration power interruptions, or back-up power supplies using batteries, generators, or the like for longer term data retention.

Persistent storage devices, such as disk, tape or Flash memory retain stored data even if the power source is removed from the device, and are often used to back up the non-persistent data storage devices, and for longer term data storage where the cost or reliability of providing continuous power is not practical.

Flash memory, amongst the presently used persistent memory technologies, has a lower latency than mechanical devices such as disks, but has more latency than the non-persistent memory types in current use. The price of Flash memory and similar solid state technologies has traditionally been governed by a principle known as Moore's Law, which expresses the general tendency for the capacity of a device to double, and the price to half, during an 18-month period. As such, the cost of storing data in Flash memory rather than in, for example, a disk is expected to reach parity soon.

Flash memory is a generic term, and a variety of types of solid state devices may be considered to be Flash memory. Originally there was an electronically erasable programmable read only memory (EEPROM), followed by other developments, which are known as NOR-Flash, NAND-Flash, and the like. Each of the technologies has a different design and organization and differing attributes with respect to the reading and writing of data. That is, there may be a restriction on the minimum size of a block of data that may be either read or written (e.g., data word, page, or data sector), or a difference in the time necessary to read or to write data. In many memory applications, the time for reading or writing data is not deterministic, and may vary over a wide range. In addition, the lifetime of a Flash memory device is considered to be subject to a wear-out mechanism, and is measured in read, write (also called "program" when referring to Flash memories) or erase cycles. Erase is the process of setting all of the memory cells of a block of pages of Flash memory to a state where new data can be programmed into the pages of the block. Herein, the term "write" may be used to mean "program" when a Flash memory is being used.

The failure mechanism of Flash memories may be broadly divided into a conventional failure mode which is associated with a defect in the construction which is either latent, or which develops by the passage of time, and which is considered typical of electronic components, and a wear-out mechanism. Typically, the wear-out mechanism is related to the number of times a Flash memory block is accessed for an erase operation and subsequent write operation. Although this is an electronic failure mechanism, one may consider it as more typical of a mechanical failure mechanism, such as being due to the number of miles that a car has been driven, rather than the calendar time and is manifest in a gradually increasing raw bit error rate. Both mechanisms may need to be considered in system design, and the overuse of a particular memory location avoided, by hardware or software management of the system operation so as to avoid premature wear out.

NAND Flash memory is programmed by applying a voltage to individual cells of the memory so as to store a charge value representing a value of a stored data bit. Presently, there are three varieties of such memories available in commercial quantities, termed SLC (single-level cell), MLC (multilevel cell, generally meaning that there are three voltage levels in addition to the unprogrammed state so as to store two bits of data) and TLC (three-level cell for storing three bits of data in eight voltage levels). So, there are memory cells where one, two, or three bits of information may be stored. In practice, the technology used has resulted in a situation where the lifetime decreases, the read, write and erase times increase, and the cost decreases as the number of bits stored per cell increases. There is also a trend to smaller feature sizes in the semiconductor process so as to increase the density of the storage, and this also tends to degrade performance, including lifetime, but reduce cost.

Another salient characteristic of NAND Flash is that the data is written (programmed) in contiguous pages to fill an area of memory known as a block. Individual pages of a block cannot be re-written or modified unless the entire block of data has been "erased." Erasing the block comprises the operation of setting all of the memory cells of the block to a same state, which is usually the lowest voltage. The lifetime of each memory cell is a function, amongst other things, of the number of times that the cell has been programmed and erased. While the entire block is subject to an erase operation, the effect on the lifetime of an unprogrammed cell may be much less than the effect of a cell that is programmed to the highest voltage level.

Conventionally, the lowest voltage state need not be programmed, and represents a logical "1" in a SLC, a logical "11" in a MLC and a logical "111" in a TLC. Such cells would have the longest lifetime in a block. The highest voltage state would be associated with "0", "00" and "000", respectively. For illustrative purposes a SLC example is used herein as this is more straightforward to describe. Since the blocks are filled with data having varying characteristics over the lifetime of the cell, the lifetime of a cell would depend on the relative number of times a "1" is written rather than a "0", and this is data dependent. MLC and TLC may be addressed with alterations to the coding schemes described herein, as would be apparent to a person of skill in the art having the benefit of this disclosure.

Where, for example, MLC Flash memory is used, preferentially storing "11" leads to base state, where other combinations "10", "01" and "00" require programming to various voltages. So, when performing substitute encoding, either on learned or predetermined basis, substitute codes for the most frequently observed symbols should preferentially align the occurrence of "11" with even bits of a byte. Other optimizations may consider the combinations of characters that are found in ASCII plain text or in the compressed data so as to achieve this result. A similar approach may be used for memory cells that store three or more states per cell.

In another aspect, Flash memory cells are known to lose charge over a period of time, such that the voltage state of the cell is reduced. Over time this may lead to a bit error if the data is not periodically refreshed. By reducing the number of cells that need to be programmed in order to store a fixed amount of user data, the number of cells that are subject to error by this process is reduced, thus increasing the reliability of the memory. NAND Flash memory is used in the examples herein as it is the most commonly available solid state memory technology. However this system and method may be adapted to offer advantages when used with other solid state memories that are known to be in development such as phase change memory (PCM), ReRAM, and to be developed solid state memories. Managing the probability of bit occurrence in a word or block may be used to reduce the number of memory cells that are programmed or that may need to be reprogrammed. The changing of state of a bit or bits of a memory cell requires power and this may be a significant consideration in design. In addition, the wear characteristics of newly developed memory technologies is not as yet well characterized, and specific bit patterns or bit probabilities may be beneficial. This may also have an effect on programming or read-dependent errors. Also, the data compression achieved may be beneficial in overall memory system management and economics.

A memory system may store data received from many sources, and these sources include a variety of data types including, for example, encrypted data using various encryption techniques, compressed data using various compression techniques, and data having the characteristics of, for example, ASCII text, or other alphabet sets. The data may be structured or unstructured, and the memory system may receive the data to be stored without any hint as to the type of data that is involved. In some instances a header or other data characteristic may identify the data.

SUMMARY

A method of storing data in a memory system is disclosed using a processor configured for receiving a data set from a user for storage. The data set is processed such that a Wear Index (WI) of the processed data set is reduced with respect to a Wear Index of the received data set. The Wear Index, may be computed, for example, as an average voltage value used to store the data set in a Flash memory. The data set is stored in a memory area of the memory system that is not larger than that of the received data set, including user metadata intended to be stored with the received data. The data portion of the received data set may have a size of a page of the memory system and the page of the memory system includes a spare area for user metadata intended to be stored with the received data.

The step of processing may include a step of encoding the data set to alter a balance between a number of "1" and a number of "0" bit states using an encoding substitution table, where the encoding substitution table may be determined by a relative frequency of occurrence of byte values in the data set. The data may be losslessly compressed either prior to or subsequent to the step of compressing the data.

In an aspect, where the size of a data set is a page the method includes determining a size of the data set after the step of losslessly compressing the data set; and, storing the processed data set if the size of the data set is less than a predetermined limit; or storing the received data set if the size of the data set is greater than the predetermined limit. When the compressed data is stored, indicia of the compression type may be stored; and, when a substitution table is employed, indicia of the substitution table the substitution table may be stored in the page. Where such substitution tables are used in a plurality of data sets, a substitution table may be separately stored and reference by the metadata stored in the page.

In another aspect, a value of the Shannon Entropy (SE) or, for example, other statistical characterization such as the standard deviation of the received data set, may be computed and the step of processing the data use a Wear Index reduction technique selected according to the value of the Shannon Entropy or other statistical measure. The lossless compression technique may also employ the SE as a selection criterion.

In yet another aspect, a plurality of methods of processing or compression are performed and result of the plurality of processing methods having the lowest Wear Index is selected for storage.

A method of computing the Wear Index (WI) includes determining an average voltage level needed to store the data of a received data set which may be a plurality of pages; partitioning the data set into a plurality of subsets, each of which may be a page; determining an average voltage needed to program the data of each subset; and, inverting bit values of each subset where average voltage level is greater than the average voltage level for the received data set. The WI reduction may be computed over the encoded data set or the encoded and compressed data set and compared with the WI of the received data set.

A further method of storing data includes providing a data memory and configuring a processor to perform the steps of: partitioning a data set into a plurality of subsets; selecting a bit state as desired bit state; determining a predominant bit state of each subset; inverting the bit values of each subset where the predominant bit state is not the desired bit state to form a resultant data set; and losslessly compressing the resultant data set.

In an aspect, the data set may have a size equal to a data page of the memory, and the method determining if the compressed resultant data set and a record of the inverting step can be stored in the a memory space of less than or equal to the data set; and if the resultant compressed data and the record of the inverting step can be stored in the memory space, storing the resultant compressed data and the record of the inverting step in the memory; or, if the resultant compressed data and the record of the inverting step cannot be stored in the data page, string the received data set in the page and a bit indicating uncompressible data in metadata.

A memory system is disclosed, comprising a processor and a data memory, where the processor is configured to receive a data set from a user for storage; process the data to change the balance of "1" and "0" bit states such one of the two bit states predominates; to losslessly compress the process data, either before or after the balance of bit states is changed; and to store the data in a memory area of the memory that is not larger than the received data set.

A computer program product stored on a non-transient computer readable medium is disclosed, comprising instructions configuring a computer to receive a data set having a size from a user for storage, process the data set to reduce the average voltage required to store the data set in memory, to losslessly compress the processed data set and to store the losslessly compressed processed data set in a memory area that is not larger than the size of received the data set. The steps of processing the data and compressing the data may be performed in either order.

BRIEF DESCRIPTION OF THE DRAWINGS

FIG. 8A is an example where a plurality of encoding and compression steps are performed by the processing system of FIG. 7 and one of the results is selected for storage; and FIG. 8B is an example of data flow in the processing system associated with retrieving stored data, where the date has been wear index reduced and compressed prior to storage.

DESCRIPTION

Figure 1:
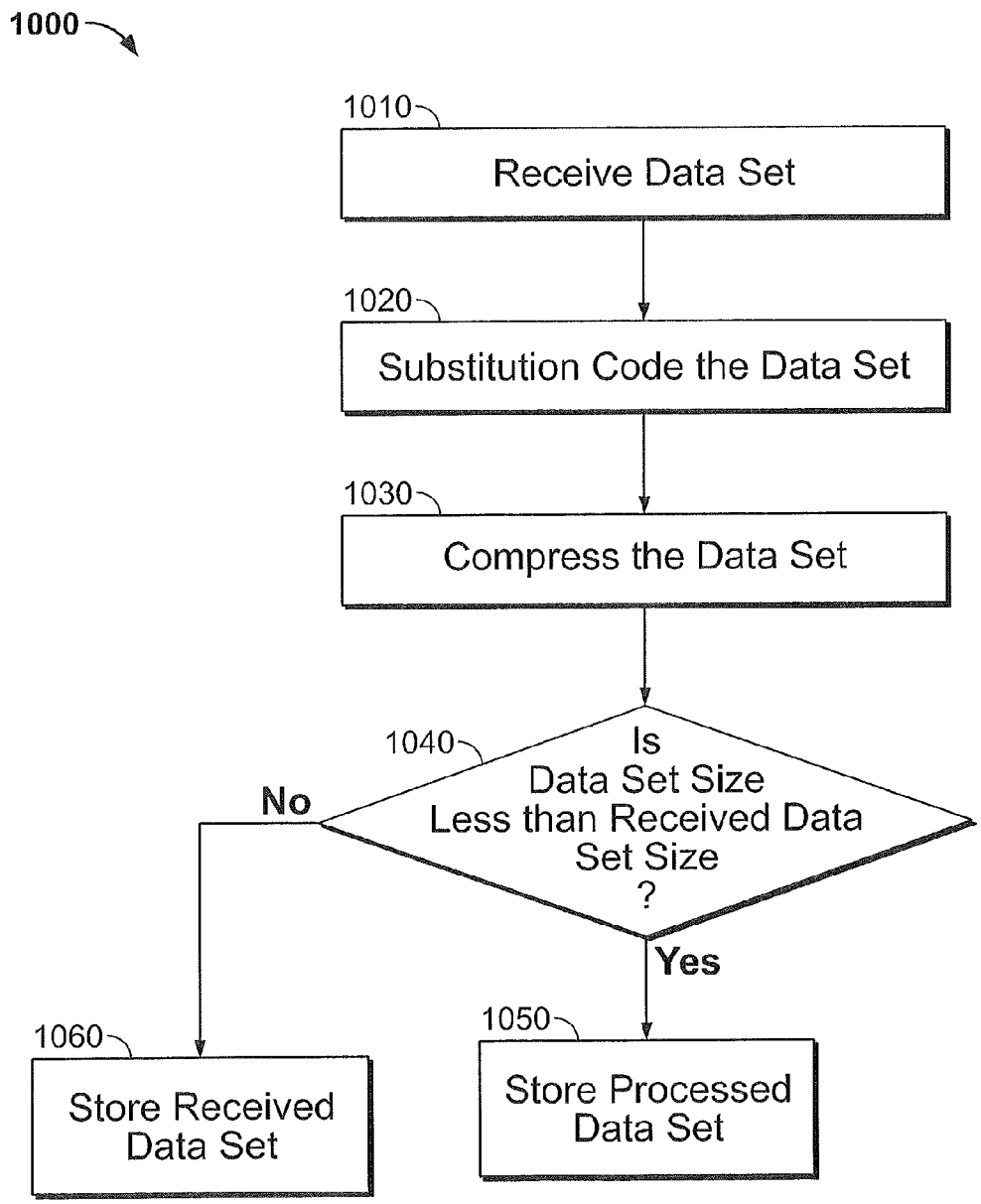
FIG. 1 is an example flow chart of an embodiment of method.

Exemplary embodiments may be better understood with reference to the drawings, but these embodiments are not intended to be of a limiting nature. Like numbered elements in the same or different drawings perform equivalent functions. Elements may be either numbered or designated by acronyms, or both, and the choice between the representation is made merely for clarity, so that an element designated by a numeral, and the same element designated by an acronym or alphanumeric indicator should not be distinguished on that basis.

It will be appreciated that the methods described and the apparatus shown in the figures may be configured or embodied in machine-executable instructions, e.g. software, or in hardware, or in a combination of both. The machine-executable instructions can be used to cause a general-purpose computer, a special-purpose processor, such as a DSP, array processor, or the like, that acts on the instructions to perform functions and actions described herein.

Alternatively, the operations might be performed by specific hardware components that may have hardwired logic or firmware instructions for performing the operations described, or by any combination of programmed computer components and custom hardware components, which may include analog circuits. Such components may include Application Specific Integrated Circuits (ASIC), Field Programmable Gate Arrays (FPGA), or the like which may exist or are being developed and have the capability of configurable logic.

The methods may be provided, at least in part, as a computer program product that may include a non-volatile (non-transient) machine-readable medium having stored thereon instructions which may be used to program a computer (or other electronic devices) to perform the methods. For the purposes of this specification, the terms "machine-readable non-transient medium" shall be taken to include any medium that is capable of storing or encoding a sequence of instructions or data for execution by a computing machine or special-purpose hardware and that may cause the machine or special purpose hardware to be operable to perform any one of the methodologies or functions of the present invention. The term "machine-readable medium" shall accordingly be taken include, but not be limited to, solid-state memories, optical and magnetic disks, magnetic memories, and optical memories, as well as any equivalent device that may be developed for such purpose.

For example, but not by way of limitation, a machine readable medium may include read-only memory (ROM); random access memory (RAM) of all types (e.g., S-RAM, D-RAM. P-RAM); programmable read only memory (PROM); electronically alterable read only memory (EPROM); magnetic random access memory; magnetic disk storage media; Flash memory, which may be NAND or NOR configured; memory resistors; or electrical, optical, acoustical data storage medium, or the like. A volatile memory device such as DRAM may be used to store the computer program product provided that the volatile memory device is part of a system having a power supply, and the power supply or a battery provides power to the circuit for the time period during which the computer program product is stored on the volatile memory device.

For purposes of claim interpretation, the memory for storing a computer program product is "non-transient," where such a definition is given the broadest interpretation in terms of applicable memory types and techniques consistent with governing case law. Functions that are performed by a computer operable to process and execute the code may be equivalently performed by an electronic circuit.

Often the data is managed in the form of a logical array as the data structure. However, the same logical array may be associated with a physical memory array having the same organization, or other organization. Although the operation of many of the examples herein are described as if there were a direct correspondence between the logical data structure and the physical location in memory where the data is stored memory, this may not be the arrangement in practice, where the assignment of data to memory locations may be governed by the architecture of the memory system, the possibility of bad (e.g., failed or missing) memory locations, wear leveling considerations, and the like and may be mediated by an indirection process such as a Flash Translation Layer (FTL).

A relationship between logical and physical addresses may be presumed when interpreting the examples described herein for clarity of explanation. The choice of logical or physical addresses for discussion is a matter of convenience and is not a restriction, unless specifically mentioned. Generally, herein, the data of a page that is received for storage is described as logical values, and the equivalent physical voltage level of the programmed memory cell is implied. The structure or method of interconnecting the memory elements is not intended to be constrained by this description. Moreover, the physical memory may be realized as a plurality of modules, a single module or a single substrate, as examples.

Furthermore, it is common in the art to speak of software, in one form or another (e.g., program, procedure, process, application, module, algorithm or logic), as taking an action or causing a result. Such expressions are merely a convenient way of saying that execution of the instructions of the software by a computer or equivalent device causes the processor of the computer or the equivalent device to perform an action or a produce a result, as is well known by persons skilled in the art.

When describing a particular example, the example may include a particular feature, structure, or characteristic, but every example may not necessarily include the particular feature, structure or characteristic. This should not be taken as a suggestion or implication that the features, structure or characteristics of two or more examples should not or could not be combined, except when such a combination is explicitly excluded. When a particular feature, structure, or characteristic is described in connection with an example, a person skilled in the art may give effect to such feature, structure or characteristic in connection with other examples, whether or not explicitly described.

The memory array may be formed by a plurality of Flash memory modules and other semiconductor memory devices, which may be volatile or non-volatile memory devices. Herein, while the examples are provided using NAND Flash memory circuits as the memory device of the memory system, there is no intent to preclude the use of any form of persistent or non-persistent memory such as has been described above, or which may hereafter be developed for a same or similar function, either alone or in combination in the design or construction of a memory system.

For simplicity of explanation, data is considered to be recorded as 2 Kbyte pages and a block comprises 128 pages. A person of skill in the art would understand that pages of greater or lesser size and blocks of greater or lesser size may also be used, depending on the particular memory product and software being used. Moreover, a "2 Kbyte" data block would be understood to include 2 Kbyte of user data plus any metadata that would be stored in a "spare" area associated with the page or block. Such metadata may also be stored in another location. The metadata may include, for example, an error correcting code (ECC), logical source address, or other management information related to the data and the page. The examples generally explain the process using SLC memory for simplicity, however a person of skill in the art would appreciate that the WI is a applicable to memories storing more than one bit per cell.

The FLASH memory types currently commercially available are often limited to one write operation of data to a page and the block containing the page needs to be erased prior to writing new data. Coding schemes have been developed to permit a limited number of rewrites to a page prior to erasure, or for the page to be refreshed in place. Nevertheless, so long as erase operations need to be eventually performed on the block, the techniques herein will result in a reduction in the wear and power consumption.

Data being stored or being transmitted are often encoded for error correction or other purposes, and such codes, being redundant information, increase the number of bits that may be needed to represent the data. Storing this additional information results in a lowering of the storage capacity of the memory.

Bit positions in a word may be remapped for actual storage in memory cells and a coding scheme for the data may be devised to precondition the data so as to maximize the number of cells with "1" in SLC which have the minimum programmed voltage. Where MLC and TLC are used, the coding scheme for remapping can be chosen to minimize the average voltage level for the cells of the page. For example, each nibble (3-bits) stored in a TLC cell can be assigned a value equal to the voltage level of the cell that needs to be programmed to represent the value. The average voltage level of the cells of the page may be computed and used as a predetermined threshold. Where the processing results in a data set with a lower average voltage than the predetermined threshold, the processed results would create less wear and could be stored. The average voltage level of the data stored in a page may be termed a "Wear Index" and a lower Wear Index may result in a longer wear out time as measured, for example, by program/erase cycles. One should note that in MLC and TLC, the relationship between bit values and the voltage level of a cell may be more complex that that described here, but the bit pattern of a plurality of logical cells may be mapped to the Wear Index.

The choice of "1" for unprogrammed and "0" for programmed is entirely a matter of convention. Similarly, the association of "programmed" with a state of the cell that is not the lowest voltage state and "unprogrammed" being the lowest voltage state is not intended to be a limitation. Rather, a person of skill of the art will appreciate that these terms are descriptive of the underlying processes and represent the commonly used engineering conventions.

The effect of the data values upon the write endurance of a FLASH circuit may be related to the percentage of the cells in a page that are written with the "0" voltage. Were the original data to be modified so as to increase the percentage of "1" voltage cells by some coding scheme, the wear properties of the memory would be improved as each cell would be written less often or to a lower average voltage. Such a scheme may be selected so as not result in an increase in the number of data bits to be stored to represent a fixed-length page of original data; there is only a relatively small data area that is available for metadata in the spare area of a page, and a reduction in space allocated for such metadata may introduce design or reliability complications.

Other benefits of the system and methods described herein may include a reduction in power consumption and a reduction in page programming time. Since cells having a value of "1" undergo no change in charge state, the power to "program" a "1" is less than that for a "0". Similarly, the time needed to program the "0" voltage level and to verify the level is greater than if there were no change in voltage level.

A Flash memory system may be used to store any type of digital data. In general, a user may store data having a variety of data types in the memory system. These may be, for example, ASCII encoded data, fill patterns for unoccupied pages, executable computer instructions, files, or image data as examples. This data may be in a compressed or uncompressed format, and may be encrypted or unencrypted. Each of these data types and formats may result in a different characteristic statistical distribution of binary bits, and a different relationship between the original data and the data that is to be stored.

This variety of data types and formats may vary on a page-to-page basis in systems where the user operates in a virtualized environment where a plurality of users share a server and a plurality of users or a plurality servers may share a memory system. In such a circumstance each page may have different statistical characteristics.

We describe a system and method for reducing the percentage of "1" cells written to represent an original page of data that does not result in an increase in the total size of the stored data of the page, including any additional coding associated with the reduction in "1" bits. The system and method may also result in a reduction in the amount of memory needed to store an original page of data. Such data compression also effectively reduces the wear on the Flash memory. The information content of a page of data may be estimated by computing the "Shannon Entropy", which quantifies the state of disorder of the data. The original formulation of the computation, as is known in the art, used an outcome range of 0 to 8 although some publications use a range of 0 to 1; herein, we use the original range. A value of 8 is a state of total disorder, while a value of 0 is completely ordered. One may visualize this as: with a value of 8 the probability of a next bit in a sequence having a value of "0" or "1" is independent of the value of the present bit, whereas with a value of 0 the probability of a next bit being the same as the value of the present bit is unity. Most blocks of data lie between the upper and lower bounds.

In an aspect, the higher the Shannon Entropy value of a data set, the more efficiently the transmitted or stored data has been represented by the data encoding scheme. Encoding schemes include various encryption algorithms such as AES, DES, HTTPS, PGP and the like, as well as ASCII and related codes. A highly effective encryption technique is expected to yield a Shannon Entropy approximately equal to 8, whereas ASCII coded data may have an entropy of about 5 ("Shannon Entropy" and "entropy" are used interchangeably herein). Data compression algorithms such as LZ, LZW, run-length encoding, Burrows-Wheeler transform and the like may also be used to reduce the number of bits necessary to encode, for example, ASCII data. The compressed representation is more efficient than the original ASCII code as it uses fewer bits to represent the same data and serves to increase the entropy value of the compressed data.

This premise may be understood by considering a page that is entirely filled with a particular repeating binary pattern. Such a pattern may be highly compressed, for example, by using run-length encoding such that only a single binary byte and the number of bytes in the page can represent the page of data. Such a scheme may result in highly effective compression and data storage (see, for example, U.S. Pat. No. 8,452,929, "Method and System of Storing Data in Non-Volatile Memory, issued May 28, 2013; and, U.S. Pat. No. 7,907,069, "Fast Compression Data for Scientific Data", issued on Mar. 15, 2011, which are commonly owned and which are incorporated herein by reference.) It may be possible to store the entire page in the system metadata or in the flash translation layer (FTL). But, if the same page has been encrypted, an apparently random pattern of bits results, and this in not amenable to substantial compression by commonly employed algorithms.

Data that is sufficiently compressed by the methods described herein may be packed such that more than one page of user data is stored in a single page of memory, and, where a RAIDed architecture is used, the data and the associated metadata may be further optimized. (see U.S. Ser. No. 13/911,632, filed on Jun. 6, 3013, "Optimization of RAID Storage Group", which is commonly owned and is incorporated herein by reference.) Herein, when data compression algorithms are described, a lossless-type of compression algorithm is meant. Lossy data compression may have been used by the data owner, for music, for pictures and the like, prior to sending the data to the memory system, but the objective here is use a data compression method that permits the data to be faithfully stored and recovered for the data owner.

TABLE 1

Comparison of "0" counts for ASCII and "modified" ASCII for decimal numbers.

| Modified ASCII | ASCII | Fewer 0s | % Reduction | Decimal Value |
|---|---|---|---|---|
| 111 1111 | 011 0000 | 5 | Infinity | 0 |
| 111 1110 | 011 0001 | 3 | 300% | 1 |
| 111 1101 | 011 0010 | 3 | 3005 | 2 |
| 111 1011 | 011 0011 | 2 | 200% | 3 |
| 111 0111 | 011 0100 | 3 | 300% | 4 |
| 110 1111 | 011 0101 | 2 | 200% | 5 |
| 101 1111 | 011 0110 | 2 | 200% | 6 |
| 011 1111 | 011 0111 | 1 | 100% | 7 |
| 111 1100 | 011 1000 | 2 | 200% | 8 |
| 111 0011 | 011 1001 | 1 | 150% | 9 |

As a simple example, consider a code substitution table for a block of data comprised entirely of decimal numbers represented by an ASCII code. Table 1 has a "modified ASCII" value corresponding to each ASCII value selected so as to reduce the number of "0" bits to be programmed so as to represent each decimal number.

The code substitution of Table 1 has reduced the number of "0" cells needed to represent the numbers between 0 and 9 from 35 to 11. So, effectively, a data block comprised entirely of decimal numerals would have about one-third the number of cells in a "0" state when a block erase was needed, with a corresponding decrease in wear.

Data coding schemes such as ASCII arose in an early era of digital data and such schemes did not take account of the number of "0" and "1" values in each data word with respect to the frequency of occurrence of the symbol (e.g., the letter "e") in a natural language. The probability of occurrence of characters and symbols in the English language is shown in Table. 2.

When considering the probability of occurrence of characters in the English alphabet as written, as is known, the most common character is the space, and the cumulative probability of the characters in the table is about 0.7. So, in an example, by assigning, for example the modified ASCII of Table 1 to numbers and ten other selected ASCII characters having a lower Wear Index to the bytes of 8-bit code words (e.g., letters of Table 2) having the predicted or observed highest probability of occurrence, the overall Wear Index (WI) of a page may be reduced. This scheme could result in an average reduction in "0" bits by greater than 50 percent.

TABLE 2

Relative Frequency of Characters in the English Language

| Character | Probability |
|---|---|
| Space | 0.174 |
| e | 0.098 |
| t | 0.070 |
| a | 0.062 |
| o | 0.059 |
| i | 0.055 |
| n | 0.055 |
| s | 0.050 |
| r | 0.048 |
| h | 0.042 |

One would not expect the owner of the data to provide this encoding, as the owner works in ASCII, and does not necessarily have insight into the manner of storing the data. So, for example, a look-up table can be provided that converts the received ASCII coded page to the modified ASCII code. In particular, if one chose a substitution code where the space character was "11111111," rather than the ASCII representation of "01000000," an immediate improvement in wear properties would be expected.

The strategy for modifying the ASCII coding may be effective for a wide range of Western alphabets; however, an alternative coding scheme may be more effective for other languages or for specialized data types. In alternative, a self-learned substitution code may be used. As will be appreciated, the modified ASCII table will need to be stored, and each page needs to be associated with the appropriate code table either by, for example, a pointer stored in the page metadata or elsewhere, such as in the FTL.

Another consequence of the substitution coding is that the entropy of the data block has been decreased. This follows from the increase in the number of ones compared with the number of zero values for the SLC case. That is, ones have become more probable. When the entropy of a data block decreases, the efficiency of coding decreases. But, data pages with inefficient coding have more redundancies and are thus amenable to data compression techniques. So, in addition to the reduction in the number of zero values, the overall number of bits representing the block can be reduced if desired using a data compression algorithm, and this may include the additional metadata.

When considering an algorithm for representing the data in a compressed form, the symbols chosen for the resultant compressed data may be chosen so as to favor the occurrence of "1" in the binary representation thereof. Alternatively, a second conversion table may be used to map the common symbols in the compressed data to a more "1"-friendly set. The process can be undone when the stored data is read and reconstituted as the selected compression technique is lossless. Since compression reduces the number of bits needed to represent the page, there are bits in a fixed length page that are not needed to store the page. Although combining pages of data requires some additional complexity, one may pack more data into a physical page, or the page may be padded with "1" or a pattern favoring "1". The choice of the padding technique may depend on second-order properties of the memory technology such as read and write disturb.

The Wear Index concept can be applied to constructing a substitution table to encode the compressed data. This takes into account the modification of the data set by the compression process. When doing this, it may be preferable to compute the Wear Index over the span of the compressed data so as to accept that the span of the compressed data is less than the span of uncompressed data and the resultant freed space will be populated with either low Wear Index fill, or other compressed data. The Wear Index of the compressed data would be reduced by a learned compression table for encoding the compressed data. The learned compression table can be stored, for example in a portion of the free space. When using this approach a encoding step prior to the compression step may be omitted. The size of the table may be limited to, for example, the most frequent symbols in the data set, as previously described.

Since this processing approach assumes some reasonable statistical properties for the user data, there are the occasional cases where, in fact, the desired effects do not occur. However, as the usual result of the system and method described herein is to reduce the number of zero values or the average voltage level in the page to be stored in SLC or the general Wear Index in other forms of Flash memory, the wear out properties of the memory are enhanced. When the methods described herein do not result in an encoded and compressed data length that is less than or equal to the original data, the original data may be stored. Since the overall objective is to reduce the average wear of the memory cells, and the data may be stored in pages scattered over the memory the effect of occasional unsatisfactory processing results, but the overall wear of the memory may be substantially reduced. There is every reason to expect that these encoding and processing exceptions would eventually be distributed over the memory array due to wear leveling, garbage collection, data refreshing, or the like. The details may also depend on buffer memory sizes, processing capability, or the like.

Generally, each page of data received from the user may thus have different formatting and statistical properties, and the code substitution or other technique for maximizing the "1" content of the page may be different. In an aspect, a plurality of the possibilities may be computed, and the best of the results used.

The Shannon Entropy or other statistical characterization may be used at one or more stages of the processing to select one or more processing approaches that are likely to be most appropriate for the actual data, and the best result used. While this may not always result in the best result for a particular page, the overall process may reduce the wear on the Flash circuits or compress the pages while avoiding excessive computation.

When encrypted data or compressed data is processed in small enough chunks, the statistical properties of purely random data may be used to advantage in wear reduction. That is, the Shannon Entropy of encrypted data samples of limited size is less than 8. In a perfectly encrypted large data set, the bits are random, but have a statistical standard distribution of values about the large set mean. A random process has a statistical variation that depends of data set size.

So, bit sequences of encrypted data may occur where there may be, by chance, a sequence of "1" bits of some length followed by a sequence of "0" bits of some length, with the probability of occurrence of a sequence having a specific length decreasing as the length of the sequence increases. It is therefore likely that a short length of encrypted data extracted from the data set representing a page will have an imbalance of "1" and "0". Yet over a large data set, the average number of "0" and "1" would be close to equal in the limit.

Figure 6:
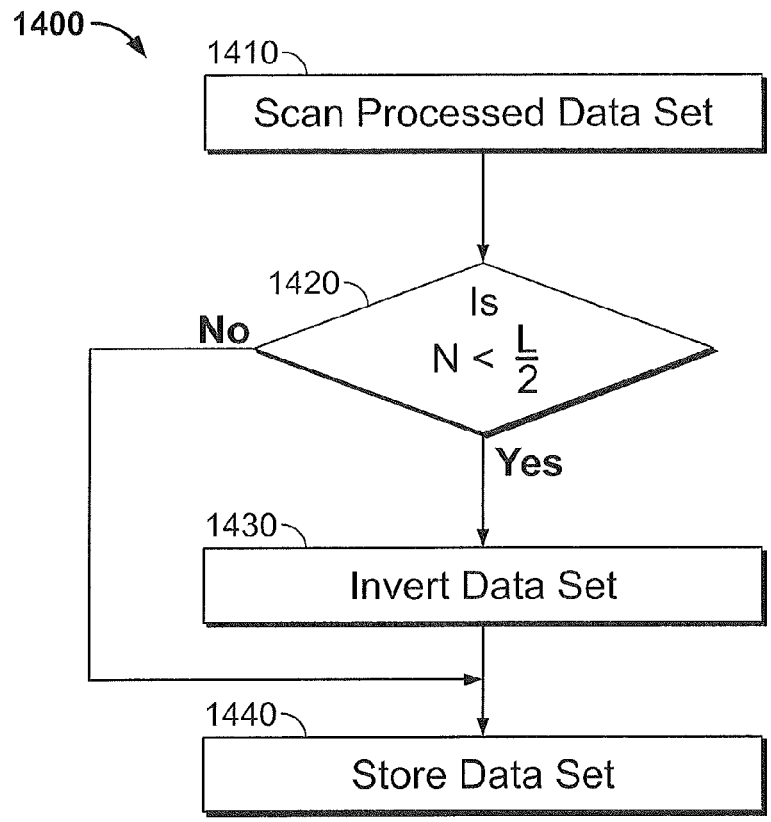
FIG. 6 is an example of a step of processing encrypted data.

For example, as shown in FIG. 6, the data set, which may be a page, may be divided into sequential sub-blocks of length L, and the number of "1"s in each block counted. Where the number N of "1" bits is less than L/2, the sub-block may be inverted since there were originally more "0" bits than "1" bits. If the number of "1" bits is greater than L/2, the sub-block may not be inverted. So, the resultant blocks all have more than L/2 "1" bits. Whether a block has been inverted needs to be recorded so that the process may be inverted when the data is read. This results in N additional bits to describe the data as non-inverted or inverted. However, the increased number of "1" bits in the data block has decreased the entropy of the selectively inverted block with respect to the encrypted block. Whereas compression is ineffective for encrypted data having very high entropy, the processing by inversion creates a situation where compression can be somewhat effective, since the data block has a greater imbalance of one values and zero values than the encrypted source data set. So long as the encoding results in a reduction of the WI, including any overhead data, used to store the data, the wear properties of the memory system will be improved. This is applicable to a SLC memory example, but a WI may be used in a similar fashion for MLC and other multi-bit-per-cell configurations.

The length of the data to be stored may be determined after encoding (including compression), and if, for example, the length is less than that of the original data block received, the compressed encoded data is stored. The space saved by the compression may be employed as a "padding" region. In a simple example, the region is filled with "1". Other data that may be to be stored in the padding region may be, for example, the inversion pattern or processing descriptor which may be a string of bits equal to the number of sub-sets of the data set that were used in the encoding. \

If the length of the encoded and compressed data set is greater than or equal to that of the original data block received, the original data page is stored as the processing has been ineffective in either increasing decreasing the WI or in sufficiently reducing total number of bits to fully represent the data. In practice, the encoded and compressed data may be selected for storage such that they have a length that is at least slightly less than the original data page. This would permit the inclusion of an identification of the encoding scheme or inversion pattern used, and perhaps other hints to the decoding process. Here, decoding means processing the data so that memory system returns the original data set, which may be a page, to the user. In cases were an adaptive compression scheme is used, the substitution table operating on the compressed data could be stored. The location of the storage may depend on whether the substitution table is used for a plurality of pages or is particular to the page. A substitution table appropriate for conventional ASCII, for example, may no longer be optimum for a compressed ASCII page and the frequency of occurrence of the characters may be changed. A substitution table may be determined and, since it may be unique to the page, the substitution table may be stored with the data of the page.

There may be some circumstances where the spare area may be used for some of the administrative data of this process. Alternatively, some of the data normally stored in the spare area may be added to the data being stored in lieu of padding the data page. In another aspect, the administrative data may be stored in the flash translation layer (FTL) metadata.

Depending on the system design, the compression or wear optimization of encrypted data or highly compressed user data may not be desired. In such cases the Shannon entropy may be used to identify data pages where the steps of bit inversion or compression may be omitted. This may be optionally selected based on processing workload.

A variety of data compression algorithms may be used. They include simple run-length encoding, semi-adaptive dictionaries and adaptive dictionaries, amongst others. The compression algorithms may be executed on the inversion-processed encrypted data, or on data where a code mapping has been used to increase the relative quantity of "1" bits. Where segments of the data are processed so as to be inverted prior to storage, the inversion would need to be undone prior to further decoding.

So, the details of the processing may depend on the properties of the data block: whether it is encrypted data, compressed data, text in a coding such as ASCII, a picture, music, or whether it has been pre-compressed, or the like. One of the techniques described herein may be more effective for a particular user data set and not for another. Manipulating the data such that the number of "1" bits per block is increased will reduce the wear on the memory and increase the memory system lifetime. The type of data may be estimated using the Shannon Entropy or other statistical measure to select a set of processing steps that will be effective.

In general the processing of a received data set may be in accordance with a method 1000, where the data set is received 1010 from the owner of the data (the "user"). During this step, the data may be characterized in a preliminary manner by computing the Shannon Entropy or the relative number of "1" and "0" bits in the data set as a Wear Index so as to aid in determining the subsequent processing. In an alternative, the data is processed by a selected contemporaneously performed combination of the previously described techniques without regard to the properties of the user data. Such processing may be performed at least in part in parallel by a logic array, for example, or by a computer, typically in a sequential or threaded fashion.

A substitution code may replace the bytes of the original data set (step 1020) with another binary code such that the WI is reduced with respect to the original data set for a particular assumed probability of occurrence of byte values in the original data set.

The substitution coded data may be further processed by a compression algorithm (step 1030). However, this step may be omitted so as to reduce the amount of data processing necessary, providing that the WI has been decreased, and the data storage method permits the use of variable sized data sets. The compression step may be performed prior to the substitution step. A slight increase in the overall amount of stored data for the compressed data set may occur as an indicator of the type of substitution code that was used in step 1020 would be stored.

Step 1030 reduces the size of the data set by employing a lossless data compression algorithm, as is known in the art. Since step 1020 has increased the probability of "1" bits, the likelihood of longer runs of "1" bits has increased, for the SLC case as an example, and the compression algorithm would result in being able to store the data set in less than the original number of bytes. Doing so effectively increases the entropy of the data, as the coding has become more efficient. The compression has two functions. It creates space in the memory page where the "padding" may be stored, and it may result in a smaller overall size of data to represent a data set.

If the substitution coding and the data compression are effective, the Wear Index and the compressed data size including administrative data has been reduced, or at least not increased. Step 1040 tests for this outcome (step 1050). If any one of the processing paths chosen leads to a better Wear Index and storage size, the result of the processing path that best satisfies a predetermined criteria is stored (step 1060). Alternatively, when the type of data is known, the sequence of coding and compression and possibly the substitution code may be predetermined.

Where the original data is encrypted data or a provision for encrypted data is provided, the substitution code may not depend on a predetermined code frequency assumption.

Figures 2, 3:
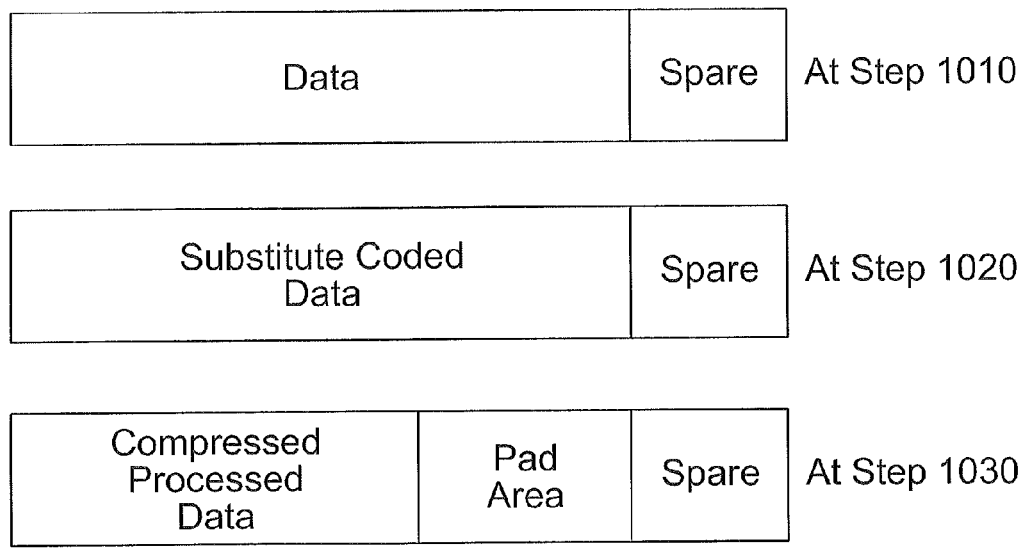
FIG. 2 is shows example data structures at various steps of the method.
FIG. 3 shows a further detail of the pad area at step 1030 of the method.

FIG. 2 illustrates an example of data structures that may correspond to the steps of the method. The original data set has a size of, for example, a page, where the page has an additional spare area for metadata. When the bytes of the data are recoded using the substitution code (step 1020), the size of the data has not changed, but the bit distribution has changed. After applying a compression algorithm (step 1030), the size of the original data has been reduced. An area of "padded" data is shown. That is, the extra space created by the data compression is filled with some arbitrary data, or some of the data from another page may be used. That data can be "1"s or some meaningful data. By filling the padded area with "1"s, the maximum reduction in programming bits for the original block of data is achieved without increasing the required storage area.

As shown in FIG. 3, it may be useful to include data identifying the particular substitution code used, the compression algorithm, any inversion code (described later) and perhaps an error correcting code (FCC) for protecting the data of the padded region. The original data, when reconstituted, may be protected by an ECC computed over the original data block and stored in the spare area, as is usual. In an alternative, the ECC stored in the padded area may be computed over all of the data (less the space for the ECC) in the original page size. Other permutations of the computation of the ECC values may be used. Typically the "pad" filling remaining would be "1"s as this is the least wear. In some memory technologies, where too long a run of "1"s may lead to errors, a pad that is weighted towards "1"s may be used although this may reduce the effectiveness of the technique. In an alternative, a method of reducing hot spots may be used.

While the average number of "1"s written has been reduced and the average wear has been reduced, hot spots may remain. For example, the spare data area may not have been subject to the method 1000. Also, the position of the padded area in a memory page may be fixed in relative location in the memory page so that patterns that are either beneficial or harmful are not distributed over the storage cells of a page during the lifetime of the storage device. Consequently, the method may also include indexing the start position of the data in the page so that the start position is incremented in the combination of the original data space and the spare space, for example, modulo (original data space+spare space). The increment may be chosen so as to divide integrally into the number of bytes in the page+spare area, or be equal to the size of the spare area, as examples. However, the start position would need to be changed after a number of block erasures so as to eventually rotate the hot spot in each page of the block. This may be based, for example, on the metadata that tracks the number of erasures on a block level of granularity. Other methods of modifying the start position of a non-optimum data pattern over a period of time may be used.

Figure 4:
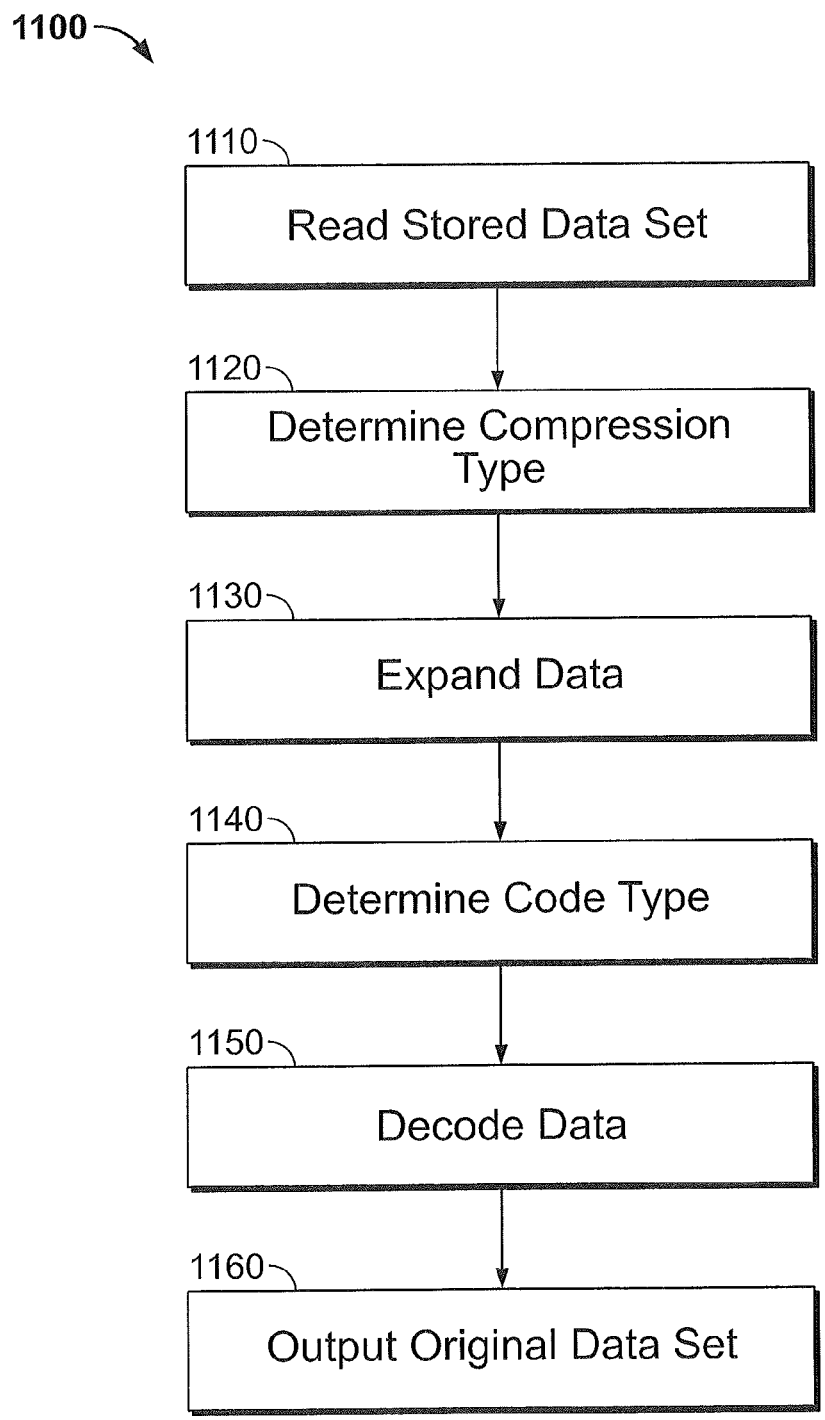
FIG. 4 is an example flow chart of an embodiment of the method for retrieving stored data.

A method of reading the data 1100 shown in FIG. 4 comprises reading the data (step 1110) and inspecting the data to determine whether the data has been compressed (step 1120). The compressed data is then expanded, if needed, (step 1130) and the substitution code type is determined (1140), where the substitution code type could include sub-block inversions. The data is decoded (step 1150) and the original data is output (1160). Depending on the original sequence of the data processing, the steps of decoding and decompressing may performed in the reverse order.

Where the data is being read for purposes other than being returned to the user, the decoding and decompressing steps need not be performed if the purpose intention of the read operation is to move the entire page to another free page or block for garbage collection or wear leveling purposes. Where the position of the spare area has been indexed, the existing index may need to be used to determine a new start index appropriate for the block and page to which the data is being re-written.

A person of skill in the art will appreciate that some of the other steps of the methods 1000 and 1100 may be performed in a different order, or be omitted, depending on the specific data storage patterns and system architecture. The compression step or the substitute coding step may be omitted.

Figure 5:
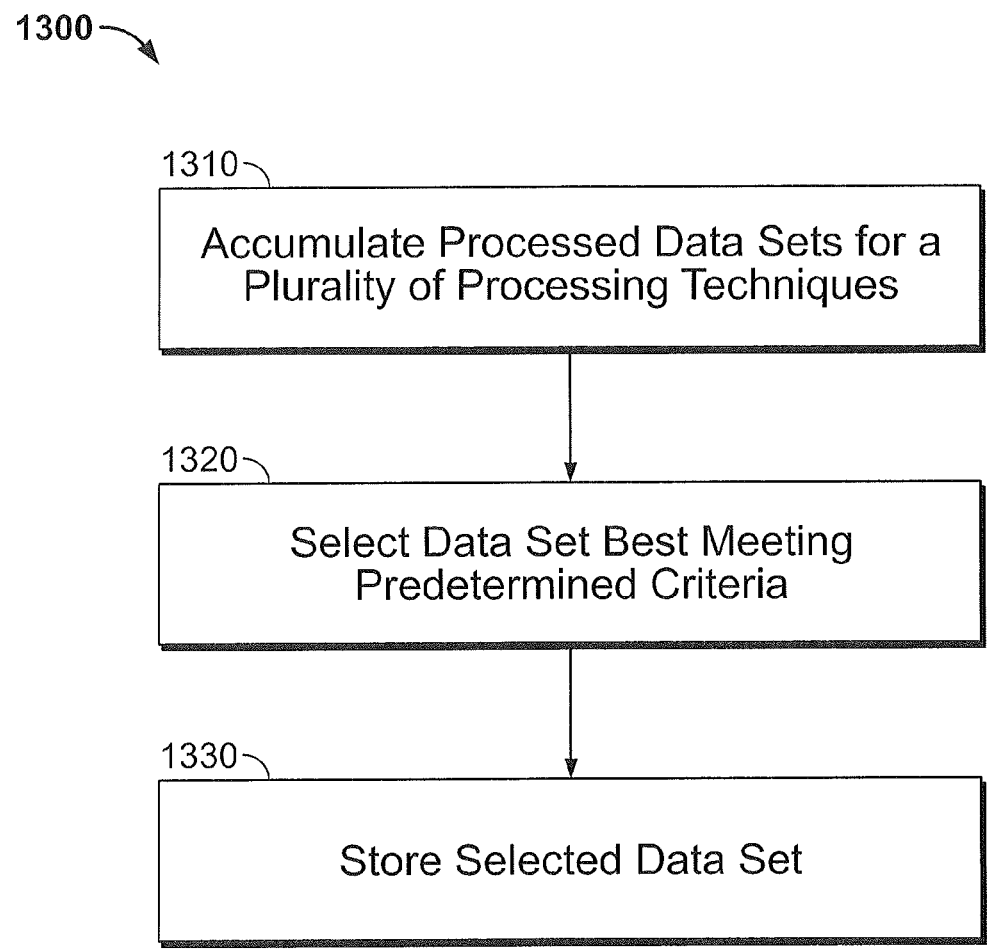
FIG. 5 is an example where the method is performed with a plurality of alternative processes and the most favorable result is selected for storage.

Which one of the encoding steps should be performed, whether a substitution code based on ASCII or some other character set should be used, or whether the data ought to be treated as previously encrypted or compressed data may not be known a priori. So, a plurality of the encoding and compression solutions may be applied to the data set and the method 1300 shown in FIG. 5 may be used. The plurality of data sets derived from the user data set may be processed to determine a Wear Index for each of the examples (step 1310) and the processed data page having the lowest Wear Index selected (step 1320) and that data page is the data page to be stored (step 1330). Other selection criteria may be used if merging of data sets is to be performed.

In some circumstances, the process of compression of the encoded data page may result in compression of the data, but the Wear Index may increase. Since a padded area has been created, this may be accepted as a consequence. Alternatively, the compressed data may be scanned to determine the relative number of "1" bits and "0" bits and if the "0" bits predominate, the compressed data may be inverted. This costs only one bit to represent the state, which may be stored, for example, in the page metadata or the FTL. As previously discussed, a learned substitution table may be generated to represent the new distribution of characters.

Where either a single known processing technique is used, or the nature of the processing technique can be deduced from the characteristics of the stored data itself, with the aid of a hint, a single bit may be used to identify data where such processing has been performed, and the bit may be stored either in the data page, the metadata or the FTL, depending on the detailed design.

In another aspect, the Shannon Entropy of the original data may be ascertained, and pages of data having greater than a predetermined entropy may be processed as "encrypted" data and may be stored as unprocessed data. This may include very well-compressed data and some misidentified pages where other codes have been used. However, data with high Shannon entropy on a page basis is likely to be highly random.

In yet another aspect, a user, when allocating a LUN, may provide a hint to the storage system as to the type of data that is typically stored. For example, the data may be image data, text data, or database tables. This hint may be used to choose one encoding technique or a group of encoding techniques from a predetermined set of encoding techniques. Selecting a processing schema based on such information may reduce the computational workload.

In a further aspect, a substitution code may be determined by experience (that is, "learned") for a LUN or group of logical addresses. This learned encoding technique may be used for all pages falling within the LUN or the logical address range. For example, the symbol frequency determined from experience may be used to encode the pages subsequently received. Since this technique may require a learning process, the initial data may not be encoded. But, after the learning process has completed, the new data, and data being located for garbage collection or wear leveling, may be decoded and re-encoded. The data used for the learning process may be reprocessed to take advantage of the learning. This learning process may be associated with the initial allocation of a LUN to a user, or be initiated on a periodic basis.

Since the encoding process such as substitution coding needs to be identified in the data, the encoding learning process may be updated periodically so that longer-term changes in the data properties are accommodated. This also allows for recognizing a misidentification of the data type by the data owner or system administrator. Eventually the stored data, even if not encoded as described herein, will be moved for wear leveling or garbage collection purposes and may be processed using the then applicable encoding table. Where an encoding table is used, for example, for a LUN, the additional metadata for each data page may be small as only an identification of the encoding table used may need to be stored with the data.

Figure 7:
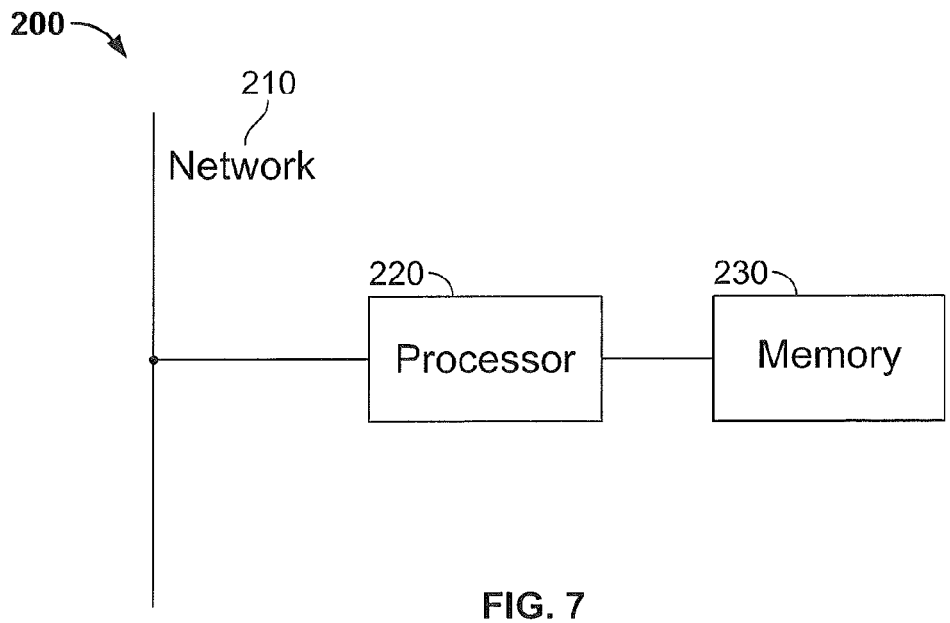
FIG. 7 is an example of a processing system for performing the method.

A system for storing data optimized for wear, as shown in FIG. 7, may include a processor 220 connected to a network 210 or other user interface, and a memory system 230. The processes previously described may be performed in either the processor 220 or the memory system 230, depending on the details of the system design. In an aspect, where at rest encryption is performed on all the data being stored in the memory system 230, the encryption and the method may be performed in whole or in part in the processor 220. Alternatively the appropriate capabilities may be provided in the memory system 230. A person of skill in the art would appreciate that the location of the resources to perform the various steps in the process would be determined during design of the system so as to be compatible with the processing technology and the data busses, the memory and other considerations of a specific design.

In an example, the methods 1000, 1200, 1300, and variants thereof may be performed in a series fashion or where some processing is done in parallel. FIG. 8A shows an example of a system intended to perform the methods.

The stored data may be returned to the user in the user format by reversing the steps of compressing (expanding) and encoding (decoding) for the selected stored data representation as shown in FIG. 8B The data statistical properties (e.g., Shannon Entropy (SE)) may be used at one or more places in the process to determine the most appropriate path or path to pursue.

In an aspect, the page of data may be processed to determine the SE and characterized, for example, as:
  a. Encrypted (compressed or uncompressed) >7.8
  b. Compressed (unencrypted) >6.8<7.8
  c. Music or image data >6.0<6.8
  d. ASCII >2.75<6.0
  e. Sparse data <2.75

The potential for compression decreases as the SE increases. Nevertheless, the balance of "1" and "0" in a page of "b"-type or "c"-type data (or the equivalent Wear Index) may be favorably altered, in the SLC case, for example, by compression as the space saved may be filled with "0". Subset inversion may also be applied either before or after the compression. If the compression is performed first, the amount of space remaining in the page for inversion descriptors may be determined, and this may influence the subsequent processing. That is the subset inversion may be done on a different chunk size, or omitted. ASCII-type data has low entropy and is suitable for both re-encoding and compression to reduce the WI.

Sparse data has low SE and may include page "fill" patterns which are repetitive and highly compressible. Where the data is not a fill pattern, the highly compressed data may have a different statistical distribution of occurrence of characters than the uncompressed data, and a learned distribution table may be used for the WI reduction. Moreover, in such circumstances, not all of the possible bit patterns may occur, and such absent bit patterns do not need a representation in the substitution table.

In another aspect, the ECC may be computed at various stages in the processing and may serve different and overlapping purposes. For example, a BCH code may be computed over the stored data and the metadata of the page and stored in the spare area of the page. In another aspect, a BCH code may be computed over the page data received from the user and stored with the data in the data area of the page. In yet another aspect, a BCH code may be stored over the encoded encrypted and filled data and stored in with the data in the data page area. Other combinations are possible, including the use of alternative error correcting codes such as LDPC and in combination with a cyclic redundancy code (CRC). The selection of ECC may depend on the type of data being stored, the amount of compression achieved and other factors which would be considered in the course of detailed design.

Although the present invention has been explained by way of the examples described above, it should be understood to the ordinary skilled person in the art that the invention is not limited to the examples, but rather that various changes or modifications thereof are possible without departing from the spirit of the invention

What is claimed is:

1. A method of storing data in a memory system:
  using a processor configured for:
  receiving a data set from a user for storage;
  processing the data set such that a Wear Index of the processed data set is reduced with respect to a Wear Index of the received data set; and
  storing the processed data set in a memory area of the memory system that is not larger than the received data set, including user metadata intended to be stored with the received data set
  wherein a size of the data set is a page and the method further comprises:
    determining a size of the data set after the step of losslessly compressing the data set; and, one of:
      storing the processed data set if the size of the data set is less than a predetermined limit; or
      storing the received data set if the size of the data set is greater than the predetermined limit.

2. The method of claim 1, wherein the received data set has a size of a page of the memory system and the page of the memory system includes a spare area for user metadata intended to be stored with the received data.

3. The method of claim 1, wherein the step of processing includes a step of:
  encoding the received data set to alter a balance between a number of "1" and a number of "0" bit states using an encoding substitution table.

4. The method of claim 3, wherein the encoding substitution table is determined by a relative frequency of occurrence of byte values in the data set.

5. The method of claim 1, wherein the step of processing includes a step of:
  losslessly compressing the data.

6. The method of claim 1, wherein the Wear Index is computed as an average voltage value used to store the data set in a Flash memory.

7. The method of claim 1, wherein the step of claim 5 is performed before the step of claim 3.

8. The method of claim 1, wherein the step of claim 5 is performed after the step of claim 3.

9. The method of claim 1, further comprising: when the compressed data is stored, the step of storing indicia of a compression type.

10. The method of claim 1, further comprising: when a substitution table is employed, storing either an indicia of the substitution table or storing the substitution table in the page.

11. The method of claim 1, wherein a value of a Shannon Entropy (SE) of the received data set is computed and the step of processing the data uses a Wear Index reduction technique selected according to the value of the Shannon Entropy.

12. The method of claim 1, wherein a plurality of methods of processing are performed and result of the plurality of methods of processing having a lowest Wear Index is selected for storage.

13. The method of claim 1, further comprising:
computing a Wear Index of the received data by performing the steps of:
determining an average voltage level needed to store the data of the received data set;
partitioning the data set into a plurality of subsets;
determining an average voltage needed to program the data of each subset; and
inverting bit values of each subset where average voltage level is greater than the average voltage level for the received data set.

14. The method of claim 1, further comprising:
estimating statistical properties of the received data set.

15. The method of claim 14, wherein the step of processing is determined based on statistical properties of the received data set.

16. The method of claim 14, wherein the step of estimating statistical properties is performed by estimating a Shannon Entropy (SE).

17. A method of compressing data, the method comprising:
providing a data memory;
configuring a processor to perform the steps of:
partitioning a data set into a plurality of subsets comprising bits;
selecting a bit state as a desired bit state;
determining a predominant bit state of each subset;
inverting a value of bits of each subset where the predominant bit state is not the desired bit state to form a resultant data set; and
losslessly compressing the resultant data set,
wherein the data set has a size equal to a data page of the data memory, the method further comprising:
determining if the compressed resultant data set and a record of the step of inverting can be stored in the a memory space of less than or equal to the data set; and, one of:
if the resultant compressed data and the record of the step of inverting can be stored in the data page, store the resultant compressed data and the record of the inverting step in the data memory; or,
if the resultant compressed data and the record of the step of inverting cannot be stored in the data page, store unprocessed data in the memory and a indicia indicating uncompressible data in metadata.

* * * * *